(12) United States Patent
Zhang et al.

(10) Patent No.: US 10,896,626 B2
(45) Date of Patent: Jan. 19, 2021

(54) METHOD, COMPUTER READABLE STORAGE MEDIUM AND ELECTRONIC EQUIPMENT FOR ANALYZING DRIVING BEHAVIOR

(71) Applicant: NEUSOFT CORPORATION, Shenyang (CN)

(72) Inventors: Michael Zhang, Shenyang (CN); Murphy Yang, Shenyang (CN); Jian Yao, Shenyang (CN)

(73) Assignee: NEUSOFT CORPORATION, Shenyang (CN)

( * ) Notice: Subject to any disclaimer, the term of this patent is extended or adjusted under 35 U.S.C. 154(b) by 350 days.

(21) Appl. No.: 15/910,642

(22) Filed: Mar. 2, 2018

(65) Prior Publication Data

US 2019/0139449 A1 May 9, 2019

(30) Foreign Application Priority Data

Nov. 3, 2017 (CN) .......................... 2017 1 1071745

(51) Int. Cl.
  *G06K 9/00* (2006.01)
  *G09B 19/16* (2006.01)
  *G09B 19/14* (2006.01)

(52) U.S. Cl.
  CPC ....... *G09B 19/167* (2013.01); *G06K 9/00798* (2013.01); *G09B 19/14* (2013.01)

(58) Field of Classification Search
  None
  See application file for complete search history.

(56) References Cited

U.S. PATENT DOCUMENTS

| | | | |
|---|---|---|---|
| 9,275,532 B2 | 3/2016 | Plummer et al. | |
| 2008/0143834 A1* | 6/2008 | Comeau | H04N 7/18 348/148 |
| 2010/0209881 A1* | 8/2010 | Lin | G09B 19/167 434/65 |
| 2014/0272810 A1* | 9/2014 | Fields | G09B 9/052 434/65 |
| 2016/0362118 A1* | 12/2016 | Mollicone | G05D 1/0276 |
| 2017/0291611 A1* | 10/2017 | Innes | B60W 40/09 |

FOREIGN PATENT DOCUMENTS

| | | |
|---|---|---|
| CN | 103593886 A | 2/2014 |
| CN | 103871242 A | 6/2014 |
| CN | 104077819 A | 10/2014 |
| CN | 105022777 A | 11/2015 |
| CN | 105303830 A | 2/2016 |
| CN | 105930771 A | 9/2016 |

* cited by examiner

*Primary Examiner* — Bruk A Gebremichael
(74) *Attorney, Agent, or Firm* — Tucker Ellis LLP; Patrick F. Clunk

(57) ABSTRACT

The present disclosure relates to a method, a computer readable storage medium and electronic equipment for analyzing driving behavior. The method comprises: acquiring image information in a running process of a target vehicle; acquiring time series data in the running process according to the image information; and acquiring a target driving behavior score for the running process according to the time series data.

6 Claims, 6 Drawing Sheets

METHOD, COMPUTER READABLE STORAGE MEDIUM AND ELECTRONIC EQUIPMENT FOR ANALYZING DRIVING BEHAVIOR

RELATED APPLICATIONS

This application claims priority to CN 201711071745.7 filed Nov. 3, 2017, which is hereby incorporated herein by reference.

FIELD OF THE INVENTION

The present disclosure relates to the technical field of data processing, and specifically, relates to a method, a computer readable storage medium and electronic equipment for analyzing driving behavior.

BACKGROUND ART

Automobiles have increasingly become a necessity of people's life, the per capita possession of automobiles has increased year by year, and driving safety also has received increasing attention from people. Vehicle-mounted equipment having a driving assistance function in the existing automobile can emit a simple prompt on the passing traffic lights or just emit an alarm on an over-speed behavior. For drivers, besides the driving assistance, in order to improve the driving safety, they need to know about their own driving behaviors, so as to guide their driving in a targeted manner.

In relevant technologies, driving behavior analysis usually uses data from a detector of a vehicle itself, e.g., a GPS, a steering wheel rotation angle, a velometer, a gyro, an accelerator, etc., and the data only reflects the state of the vehicle itself, but does not include the state of the driving environment around the vehicle, so that the driving behavior analysis is not complete or thorough enough, and cannot accurately and comprehensively reflect the driving behavior of the driver.

SUMMARY OF THE INVENTION

An object of the present disclosure is providing a method, a computer readable storage medium and electronic equipment for analyzing driving behavior to solve the problems in the relevant technologies.

In order to achieve the above object, in a first aspect of the present disclosure, a method for analyzing driving behavior is provided, including:

acquiring image information in a running process of a target vehicle;

acquiring time series data in the running process according to the image information; and acquiring a target driving behavior score for the running process according to the time series data.

Optionally, wherein the time series data comprises one or more of the following information corresponding to each timestamp: a lane where the target vehicle is located, a width of the lane where the target vehicle is located, a position of the target vehicle in the lane, a following distance between the target vehicle and a front vehicle in the same lane, a speed of the target vehicle and a distance between the target vehicle and a stop sign;

the target driving behavior score comprises one or more of the following scores: a first driving behavior score acquired according to the speed of the target vehicle and the following distance between the target vehicle and the front vehicle in the same lane; a second driving behavior score acquired according to the speed of the target vehicle and the distance between the target vehicle and the stop sign; and a third driving behavior score acquired according to the width of the lane where the target vehicle is located and the position of the target vehicle in the lane in each timestamp;

wherein the step of acquiring a target driving behavior score for the running process according to the time series data comprises:

acquiring the target driving behavior score according to one or more of the first driving behavior score, the second driving behavior score and the third driving behavior score.

Optionally, wherein the time series data comprises the following information corresponding to each timestamp: a lane where the target vehicle is located, a following distance between the target vehicle and a front vehicle in the same lane and a speed of the target vehicle;

wherein the step of acquiring time series data in the running process according to the image information comprises:

performing lane detection according to the image information to acquire the lane where the target vehicle is located in each timestamp; and performing perception detection according to the image information to acquire the following distance between the target vehicle and a front vehicle in the same lane in each timestamp;

the method further comprises:

determining a minimum following distance according to the speed of the target vehicle corresponding to each timestamp; and acquiring the target driving behavior score according to the minimum following distance and the following distance.

Optionally, wherein the step of determining a minimum following distance according to the speed of the target vehicle corresponding to each timestamp comprises:

determining the minimum following distance according to the speed, acceleration, speed correction parameter, preset reaction time and preset average parameter of the target vehicle.

Optionally, wherein the step of acquiring the target driving behavior score according to the minimum following distance and the following distance comprises:

determining a first cost value according to the following distance and the minimum following distance;

acquiring a first penalty value according to the first cost value; and acquiring the target driving behavior score according to the first penalty value and a first preset highest score.

Optionally, wherein the time series data comprises a speed of the target vehicle and a distance between the target vehicle and a stop sign corresponding to each timestamp;

wherein the step of acquiring time series data in the running process according to the image information comprises:

acquiring the distance between the target vehicle and the stop sign according to the image information;

determining a stop region of the target vehicle according to the distance; and acquiring a lowest speed of the target vehicle within the stop region and a duration of the lowest speed;

the method further comprises:

acquiring the target driving behavior score according to the lowest speed, the duration of the lowest speed and a first preset cost function.

Optionally, wherein the step of acquiring the target driving behavior score according to the lowest speed, the duration of the lowest speed and a first preset cost function comprises:

acquiring a second cost value according to the lowest speed, the duration of the lowest speed and the first preset cost function;

acquiring a second penalty value according to the second cost value; and acquiring the target driving behavior score according to the second penalty value and a second preset highest score.

Optionally, wherein the time series data comprises a width of the lane where the target vehicle is located and a position of the target vehicle in the lane in each timestamp;

wherein the step of acquiring time series data in the running process according to the image information comprises:

performing lane detection according to the image information to acquire the width of the lane where the target vehicle is located and the position of the target vehicle in the lane in each timestamp;

the method further comprises:

acquiring the target driving behavior score according to the width of the lane and the position of the vehicle in the lane.

Optionally, wherein the step of acquiring the target driving behavior score according to the width of the lane and the position of the vehicle in the lane comprises:

acquiring a lane deviation value according to the width of the lane and the position of the vehicle in the lane;

acquiring a third cost value according to a second preset cost function and the lane deviation value;

acquiring a third penalty value according to the third cost value; and acquiring a third driving behavior score according to the third penalty value and a third preset highest score.

In a second aspect, a driving behavior analysis device is provided, including:

an image acquisition module, configured for acquiring image information in a running process of a target vehicle;

a time series acquisition module, configured for acquiring time series data in the running process according to the image information; and a score module, configured for acquiring a target driving behavior score for the running process according to the time series data.

In a third aspect, a computer readable storage medium storing computer programs is provided, wherein the computer programs, when executed by a processor, cause the processor to perform a method for analyzing driving behavior comprising:

acquiring image information in a running process of a target vehicle;

acquiring time series data in the running process according to the image information; and acquiring a target driving behavior score for the running process according to the time series data.

In a fourth aspect an electronic equipment is provided, including:

the computer readable storage medium in the third aspect; and one or more processors, configured for executing the program in the computer readable storage medium.

Through the above technical solutions, the driving behavior is analyzed according to the acquired image information of the running process to acquire a driving behavior score, so that the running process of the vehicle can be analyzed more accurately and comprehensively; and the driving behavior score can be used for evaluating the driving situation of a driver and assisting the driver in improving the driving safety.

Other features and advantages of the present disclosure will be described in detail in the following specific embodiments.

BRIEF DESCRIPTION OF THE DRAWINGS

The accompanying drawings are used for providing further understanding of the present disclosure, constituting a part of the specification, and interpreting the present disclosure together with the following specific embodiments, rather than limiting the present disclosure. In the drawings.

DETAILED DESCRIPTION OF THE EMBODIMENTS

The specific embodiments of the present disclosure will be described in detail below in combination with the accompanying drawings. It should be understood that the specific embodiments described herein are merely used for illustrating and interpreting the present disclosure, rather than limiting the present disclosure.

Figure 1:
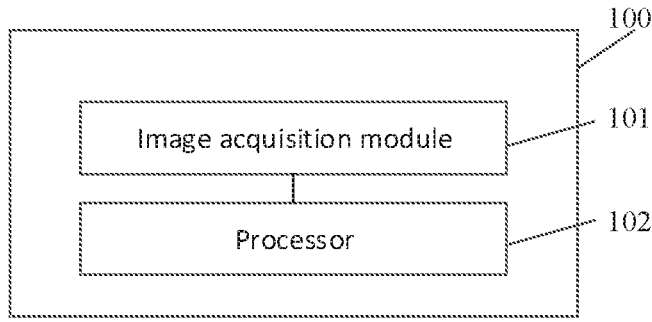
FIG. 1 is a structural schematic diagram of a vehicle in an embodiment of the present disclosure.

Refer to FIG. 1, which is a structural schematic diagram of a vehicle in an embodiment of the present disclosure. The vehicle 100 includes an image acquisition module 101 and a processor 102. The image acquisition module 101 may be a camera, an automobile data recorder, a vision sensor or the like arranged on a rearview mirror of the vehicle, and can acquire image information in a running process of the vehicle in real time.

The processor 102 performs image processing on the image information acquired by the image acquisition module 101. The image processing includes graying, binaryzation, median filtering, edge detection, region-of-interest selection, region growing, least square fitting and the like to obtain a lane line, traffic sign, signal light, front vehicle and other information in the image information.

In one embodiment, lane line recognition can be realized via a learning algorithm of a convolutional neural network and the like. Firstly, candidate target regions are selected by recognizing the contour of a video frame of the image information. Then, these candidate target regions are input to the pre-trained convolutional neural network for lane classification recognition. The convolutional neural network may be a deep convolutional neural network. In some embodiments, lane line recognition can be performed by adopting a YOLO (You only look once) detection method, an SSD detection method or the like. Similarly, the information such as traffic signs, signal lights, front vehicles and the like can also be acquired via the convolutional neural network, the YOLO detection method, the SSD detection method and other methods.

In the embodiment of the present disclosure, before object recognition, machine learning and the like are performed by using images acquired by the image acquisition module 101, the image acquisition module 101 is corrected. The correction on the image acquisition module 101 includes calibration on the image acquisition module 101 to obtain an internal reference and external reference coefficient matrix of the image acquisition module 101, wherein the internal reference and external reference coefficients can be configured for correcting images acquired by the image acquisition module 101 later to obtain images having relatively small distortion. According to image coordinates of all inner corners on the calibration images and spatial three-dimensional coordinates of all inner corners on the calibration board images, internal reference and external reference coefficients of the image acquisition module 101 are acquired.

Figure 2:
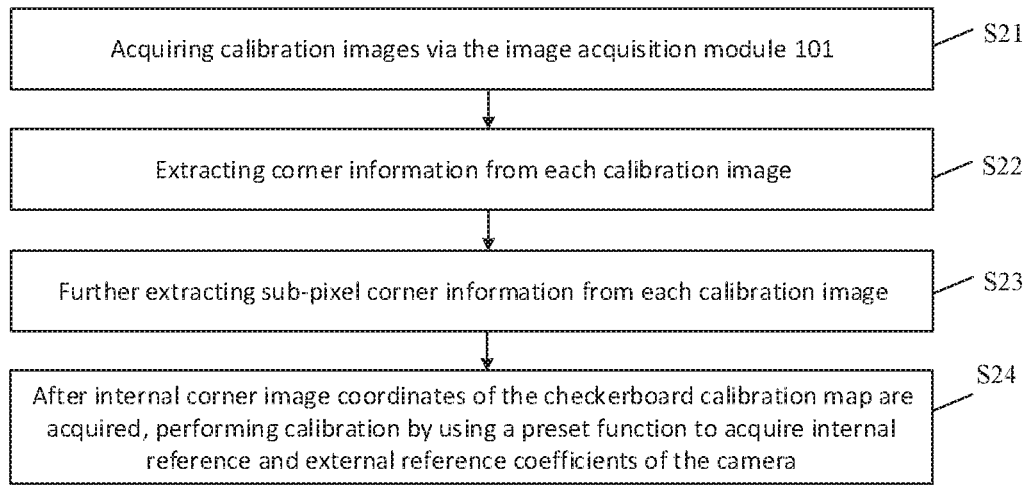
FIG. 2 is a schematic diagram of a correction process of an image acquisition module in an embodiment of the present disclosure.

Referring to FIG. 2, in an embodiment of the present disclosure, the correction on the image acquisition module 101 includes:

In step S21, calibration images are acquired via the image acquisition module 101. The calibration images are a plurality of images (e.g., 3 or 10 images, etc.) photographed by using a calibration board at different positions, different angles and different postures. The calibration board is a checkerboard map formed by black and white rectangles. In one embodiment, the checkerboard map is an 11×11 black and white square checkerboard map, and can be configured for edge deformation correction on edges of the image acquisition module 101.

In step S22, corner information is extracted from each calibration image.

In step S23, sub-pixel corner information is further extracted from each calibration image.

In step S24, after internal corner image coordinates of the checkerboard calibration map are acquired, calibration is performed by using a preset function to acquire internal reference and external reference coefficients of the camera. The internal reference and external reference coefficients include actual coordinates of each internal corner, coordinates of an image point corresponding to each internal corner, pixel size of images, a distortion matrix, as well as installation height, installation angle and focal length of the image acquisition module 101, etc.

Figure 3:
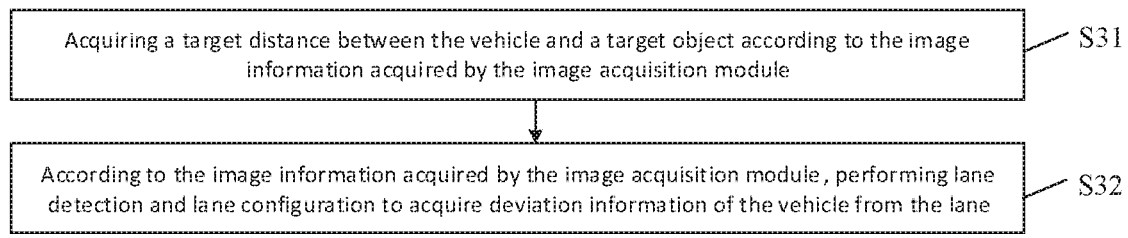
FIG. 3 is a process schematic diagram of processing image information acquired by the image acquisition module 101 in an embodiment of the present disclosure.

Refer to FIG. 3, which is a process schematic diagram of processing image information acquired by the image acquisition module 101 in an embodiment of the present disclosure.

In step S31, a target distance between the vehicle and a target object is acquired according to the image information acquired by the image acquisition module.

A described above, after the image acquisition module 101 is corrected, real world coordinate conversion from pictures 2D to 3D is performed on a picture by using the characteristics of the camera and a geometric method according to the installation height, angle and focal length of the image acquisition module 101 to measure the target distance.

In terms of measurement of the target distance, if the slope of a road is known, the image acquisition module 101 is pre-corrected to obtain the installation height, angle, focal length and other information. According to the installation height, angle, focal length and other information of the camera, coordinates represented by each pixel in the actual space can be acquired. According to the coordinates in the actual space, the target distance between the vehicle and the target object can be acquired. The target object may be other object (e.g., a front vehicle, a traffic sign, a lane line, etc.).

In the embodiment of the present disclosure, perception detection such as Yolo or SSD is performed on the image information acquired by the image acquisition module to recognize the target object, and then the distance between the vehicle and the target object is calculated.

In step S32, according to the image information acquired by the image acquisition module, lane detection and lane configuration are performed to acquire deviation information of the vehicle from the lane.

A perception detection method such as Yolo or SSD can be adopted for the lane detection. The lane configuration includes calculation of geometric characteristics of a lane, e.g., width, curvature radius and other geometric characteristics. In one embodiment, the curvature radius of the lane can be calculated by using an image processing method. If the result of recognition by the perception detection method such as Yolo or SSD is an image Q and the top view conversion matrix is T, the top view P of the image Q is: P=Q*T. Pixels on lane lines in the image P are 1, while other pixels not on the lane lines are 0. Some non-zero point clouds gathering together are obtained via edge detection, secondary function fitting is performed on these points to obtain a curve of the lane lines, and then the curvature radius of the lane lines can be calculated.

Thus, in the embodiment of the present disclosure, driving lane lines can be detected and captured according to a training database (training sample), and the curvature radius and width of the lane and the position of the vehicle in the lane can be calculated. The position of the vehicle in the lane may be the distance between the vehicle and the left side of the lane, the distance between the vehicle and the right side of the lane or the distance between the vehicle and the midline of the lane.

Figure 4:
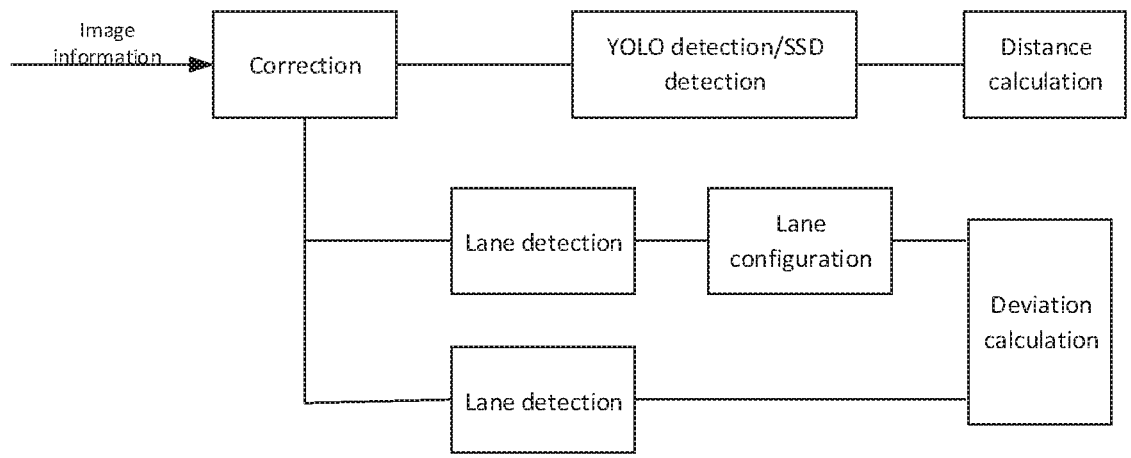
FIG. 4 is a process schematic diagram from acquiring image information by the image acquisition module to recognizing information such as a lane, a distance between a vehicle and a target object and the like in an embodiment of the present disclosure.

Refer to FIG. 4, which is a process schematic diagram from acquiring image information by the image acquisition module to recognizing information such as a lane, a distance between a vehicle and a target object and the like in an embodiment of the present disclosure. As mentioned above, the image information acquired by the image acquisition module is corrected according to the acquired internal reference and external reference coefficients. Based on the corrected image information, YOLO detection or SSD detection is performed to acquire the distance between the vehicle and the target object (e.g., other vehicle, pedestrian, traffic sign, etc.). On the other hand, based on the corrected image information, lane detection and lane configuration are performed, or only lane detection is performed, and the lane where the target vehicle is located and the geometric characteristics of the lane can be acquired, so that information about whether the vehicle deviates from the lane can be acquired.

In the embodiment of the present disclosure, the surrounding driving environment can be accurately judged via machine learning, convolutional neural network learning or the like according to the image information acquired by the image acquisition module, wherein the driving environment includes surrounding running vehicles, traffic signs, signal lights, lane lines and the like, and the distance between the driven vehicle and other object can be measured via the image. According to the recognition result, driving behavior analysis can be performed, which means analyzing, according to the data, whether the running track of the vehicle in the lane is reasonable, whether the vehicle touches the lines or whether the vehicle has abnormal drift, i.e. judging whether the vehicle runs within the lane lines according to the detection result of continuous pictures, judging whether the line is touched according to the deviation of the vehicle in the lane lines, and judging whether there is an abnormal drift according to vehicle recognition, traffic sign recognition and following distance. Thus, the driving behavior of the driver can be analyzed and scored according to the recognition result. The analysis result of the driving behavior can be used for insurance risk assessment, fleet management, vehicle design, driving learning in driving schools, self-safety improvement and the like.

Figure 5:
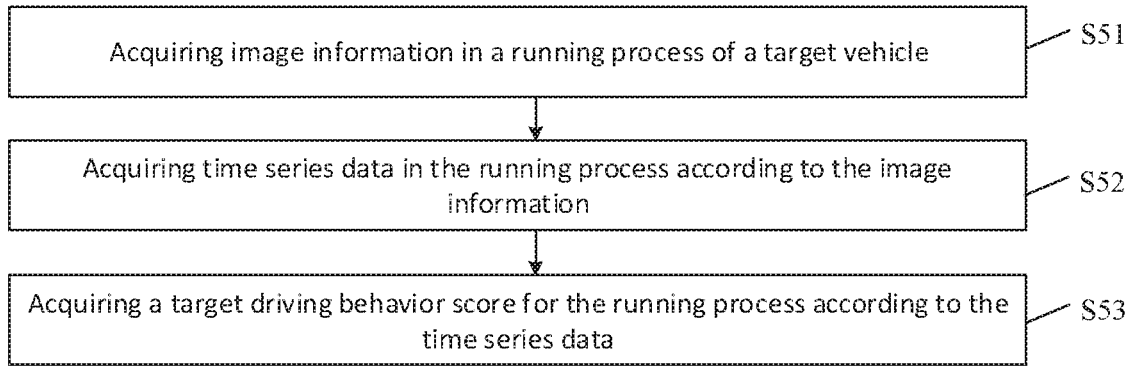
FIG. 5 is a process schematic diagram of analyzing a driving behavior according to the image information in an embodiment of the present disclosure.

Referring to FIG. 5, in an embodiment of the present disclosure, analysis on a driving behavior according to image information includes:

In step S51, acquiring image information in a running process of a target vehicle;

In step S52, acquiring time series data in the running process according to the image information; and In step S53, acquiring a target driving behavior score for the running process according to the time series data.

The image information acquired by the image acquisition module 101 is processed according to the above method to obtain time series data, and the time series data includes one or more of the following information corresponding to each timestamp: the lane where the target vehicle is located, the width of the lane where the target vehicle is located, the position of the target vehicle in the lane, a following distance between the target vehicle and a front vehicle in the same lane, the speed of the target vehicle and the distance between the target vehicle and a stop sign.

In the embodiment of the present disclosure, the target driving behavior score includes one or more of the following scores: a first driving behavior score (following score), a second driving behavior score (stop score) and a third driving behavior score (lane keeping score). In one embodiment, the first driving behavior score is acquired according to the speed of the target vehicle and the following distance between the target vehicle and a front vehicle in the same lane. The second driving behavior score is acquired according to the speed of the target vehicle and the distance between the target vehicle and a stop sign. The third driving behavior score is acquired according to the width of the lane where the target vehicle is located and the position of the target vehicle in the lane in each timestamp.

In one embodiment, the target driving behavior score is acquired according to one or more of the first driving behavior score, the second driving behavior score and the third driving behavior score. The target driving behavior score is determined according to the running state of the running process of the target vehicle. For example, the running process includes stop and following, and the target driving behavior score is determined according to the mean of the first driving behavior score and the second driving behavior score.

In some embodiments, one running process may include a plurality of running sections, and each running section is described by a piece of time series data. The driving behavior score of one running section is one of or a mean of a stop score, a lane keeping score and a following score. The score of one running process is a mean of the scores of the running sections.

Figure 6:
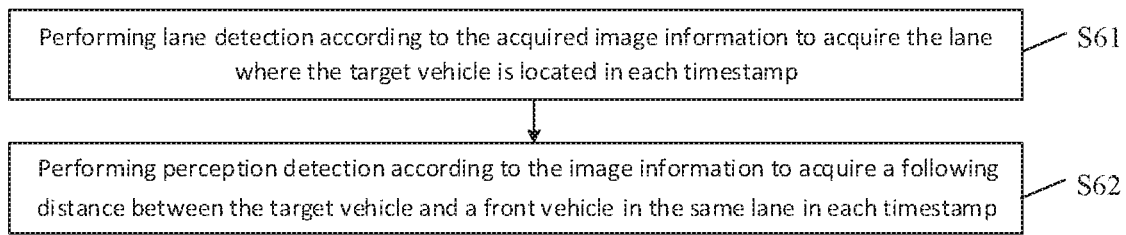
FIG. 6 is a process schematic diagram of acquiring a first driving behavior score (following score) in an embodiment of the present disclosure.

Refer to FIG. 6, which is a process schematic diagram of acquiring a target driving behavior score in an embodiment of the present disclosure. In this embodiment, the target driving behavior score may be the first driving behavior score (following score).

In step S61, lane detection is performed according to the acquired image information to acquire the lane where the target vehicle is located in each timestamp.

In step S62, perception detection is performed according to the image information to acquire a following distance between the target vehicle and a front vehicle in the same lane in each timestamp.

The lane detection and the perception detection are executed according to the aforementioned methods. Thus, a minimum following distance is determined according to the speed of the target vehicle corresponding to each timestamp; and the first driving behavior score is acquired according to the minimum following distance and the following distance.

In the embodiment of the present disclosure, the following score can be calculated in each timestamp or calculated at time intervals.

Figure 7:
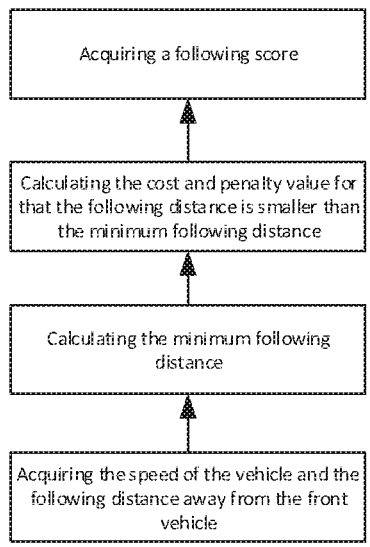
FIG. 7 is a schematic diagram of acquiring a following score in an embodiment of the present disclosure.

Referring to FIG. 7, after the speed of the vehicle and the following distance away from the front vehicle in the same lane are acquired, a minimum following distance is calculated; and the cost and penalty value for that the following distance is smaller than the minimum following distance are calculated, so that the following score is acquired.

In one embodiment, the step of determining a minimum following distance according to the speed of the target vehicle corresponding to each timestamp includes: determining the minimum following distance according to the speed, acceleration, speed correction parameter, preset reaction time and preset average parameter of the target vehicle.

In one embodiment, the minimum following distance is determined according to $D_m = c^2 * (S*t + f*S(S/a))$ and $c = 1.1 * \tanh(S/\beta)$, wherein t is a preset reaction time, e.g., may be preset as 0.5 second; f is a preset average parameter, e.g., may be set as 0.5; S is the speed of the target vehicle;

a is an acceleration, e.g., 6 m/s$^2$; and β is a speed correction parameter, e.g., 8 s/m. The unit of the minimum following distance $D_m$ is meter.

In one embodiment, the step of acquiring the first driving behavior score (target driving behavior score) according to the minimum following distance and the following distance includes: determining a first cost value according to the following distance and the minimum following distance; acquiring a first penalty value according to the first cost value; and acquiring the first driving behavior score (target driving behavior score) according to the first penalty value and a first preset highest score.

In one embodiment, the first cost value is acquired according to $$\begin{cases} \cos t = 0, \Delta \leq 0 \\ \cos t = 1/\Delta^2, \Delta > 0 \end{cases}$$

and Δ=(Dm−d)/Dm, wherein cost is the first cost value, d is the following distance, and Dm is the minimum following distance.

The first penalty value is acquired according to penalty=2.0*(1/(1+e$^{-cost}$)−0.5), wherein penalty is the first penalty value; and cost is the first cost value obtained in the previous step.

The first driving behavior score is acquired according to score=MaxS*(1-penalty), wherein MaxS is the first preset highest score, e.g., may be set as 100 scores, 800 scores, etc.; and score is the first driving behavior score.

In the present disclosure, the first driving behavior score can reflect following distance control of the driver during vehicle following and improve the safety of the driver during vehicle following.

Figure 8:
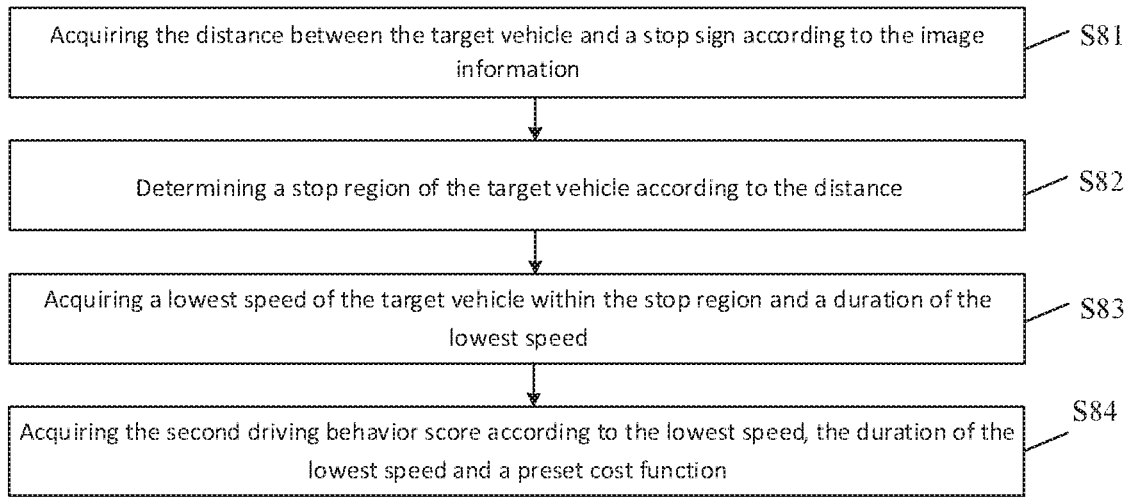
FIG. 8 is a process schematic diagram of acquiring a second driving behavior score (stop score) in an embodiment of the present disclosure.

Refer to FIG. 8, which is a process schematic diagram of acquiring a target driving behavior score in an embodiment of the present disclosure. In this embodiment, the target driving behavior score may be the second driving behavior score (stop score).

In step S81, the distance between the target vehicle and a stop sign is acquired according to the image information.

In step S82, a stop region of the target vehicle is determined according to the distance.

Figure 9:
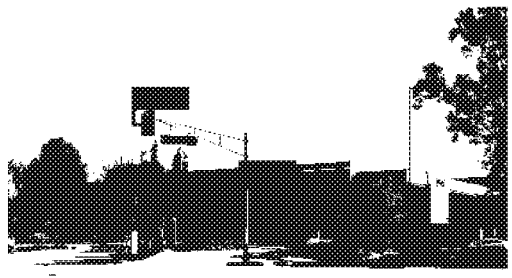
FIG. 9 is a schematic diagram of a red light stop sign in the recognized image information in an embodiment of the present disclosure.
Figure 10:
FIG. 10 is a schematic diagram of a stop sign in the recognized image information in an embodiment of the present disclosure.

In one embodiment, according to the aforementioned image processing method, when the acquired image information is recognized to include a stop sign such as red light, the running process should include a stop section. The target stop region can be determined according to the recognized stop sign. Referring to FIG. 9, the recognized stop sign is a red light. Referring to FIG. 10, the recognized stop sign is a "STOP" sign. The target stop region may be 1 meter ahead of a red light stop line to 0.5 meter behind the line, or 1 meter ahead of other stop sign to 0.5 meter behind the stop sign. The target stop region can be adjusted according to scoring requirements and traffic rules.

In step S83, a lowest speed of the target vehicle within the stop region and a duration of the lowest speed are acquired.

In step S84, the second driving behavior score (target driving behavior score) is acquired according to the lowest speed, the duration of the lowest speed and a preset cost function.

A first preset cost function is used in order to acquire the second driving behavior score, and within the stop region, zero-speed thorough stop corresponds to zero cost, while no stop and passing at a speed higher than a preset speed correspond to the highest cost.

Figure 11:
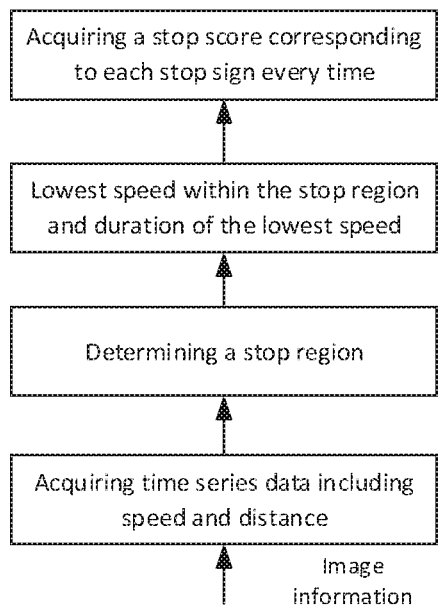
FIG. 11 is a schematic diagram of stop scoring in an embodiment of the present disclosure.

Refer to FIG. 11, which is a process schematic diagram of acquiring a stop score according to image information in an embodiment of the present disclosure.

In one embodiment, the step of acquiring the second driving behavior score according to the lowest speed, the duration of the lowest speed and the first preset cost function includes: acquiring a second cost value according to the lowest speed, the duration of the lowest speed and the first preset cost function; acquiring a second penalty value according to the second cost value; and acquiring the target driving behavior score according to the second penalty value and a second preset highest score.

In one embodiment, the second cost value is acquired according to the first preset cost function cost=(α1x)$^β$, wherein cost is the second cost value, x is the lowest speed, α1 is a real number (e.g., 0.6), and β is an even (e.g., 6). In some embodiments, the first preset cost function may be a cost function corresponding to the duration of the lowest speed, or the duration of the lowest speed can be added to the first preset cost function and the first preset cost function is multiplied with the lowest speed.

The second cost value is converted into a second penalty value according to penalty=2.0*(1/(1+e$^{-cost/α2}$)−0.5), wherein penalty is the second penalty value, and α2 is a real number (e.g., 500);

The second driving behavior score is acquired according to score=MaxS*(1-penalty), wherein MaxS is the second preset highest score (e.g., 800 scores), and score is the second driving behavior score.

In one embodiment of the present disclosure, if the running process includes a plurality of stop sections, the stop score of the running process can be determined according to a mean of stop scores of the stop sections in the running process.

In the embodiment of the present disclosure, the second driving behavior score can reflect the stop situation when the driver encounters a stop sign, assist the driver in learning his stop situation and improve the driving safety.

Figure 12:
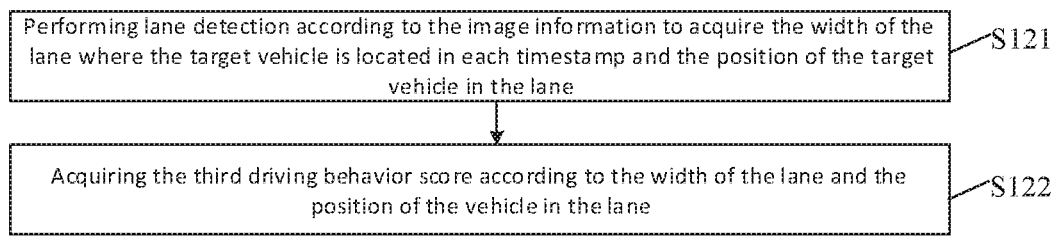
FIG. 12 is a process schematic diagram of acquiring a third driving behavior score (lane keeping score) in an embodiment of the present disclosure.

Refer to FIG. 12, which is a process schematic diagram of acquiring a target driving behavior score in an embodiment of the present disclosure. The target driving behavior score may be the third driving behavior score (lane keeping score) in this embodiment.

In step S121, lane detection is performed according to the image information to acquire the width of the lane where the target vehicle is located and the position of the target vehicle in the lane in each timestamp.

In step S122, the third driving behavior score (target driving behavior score) is acquired according to the width of the lane and the position of the vehicle in the lane.

The position of the target vehicle in the lane may be the distance between the target vehicle and the left side or right side or midline of the lane.

Figure 13:
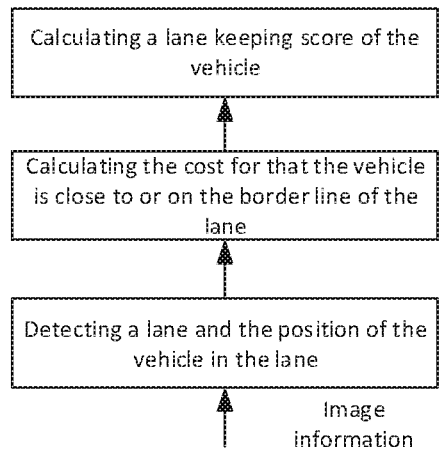
FIG. 13 is a schematic diagram of lane keeping scoring in an embodiment of the present disclosure.
Figure 14:
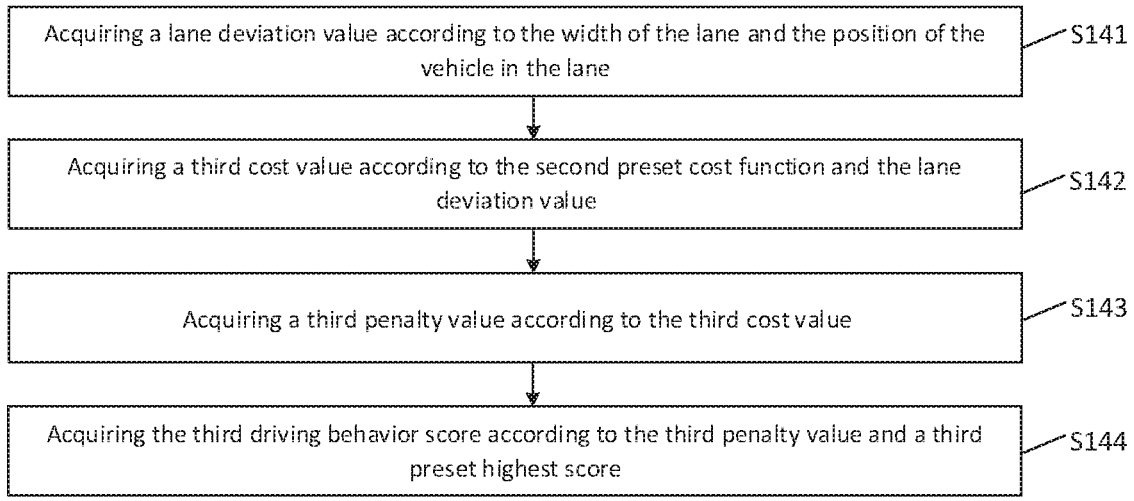
FIG. 14 is a process schematic diagram of acquiring the third driving behavior score according to the width of a lane and the position of the vehicle in the lane in an embodiment of the present disclosure.

The lane keeping score may be calculated in each timestamp or calculated at time intervals. Refer to FIG. 13, which is a process schematic diagram of acquiring a lane keeping score according to the image information in an embodiment of the present disclosure. Referring to FIG. 14, the step of acquiring the third driving behavior score according to the width of the lane and the position of the vehicle in the lane includes:

In step S141, a lane deviation value is acquired according to the width of the lane and the position of the vehicle in the lane.

In step S142, a third cost value is acquired according to the second preset cost function and the lane deviation value.

In one embodiment, when the vehicle is in the middle of the lane or near the middle, the cost value is zero. When the vehicle runs on the border of the lane and does not change the lane, the cost value is highest.

In one embodiment of the present disclosure, the second preset cost function is cost=$(\alpha|x|)^\beta$, wherein cost is a cost value, x is a lane deviation value, $\alpha$ is a real number, e.g., 3.6, and $\beta$ is an even, e.g., 6. x=(d−hw)/hw, wherein d is the distance from the vehicle to the left side of the lane, and hw is a value of dividing the width of the lane by 2.

Figure 15:
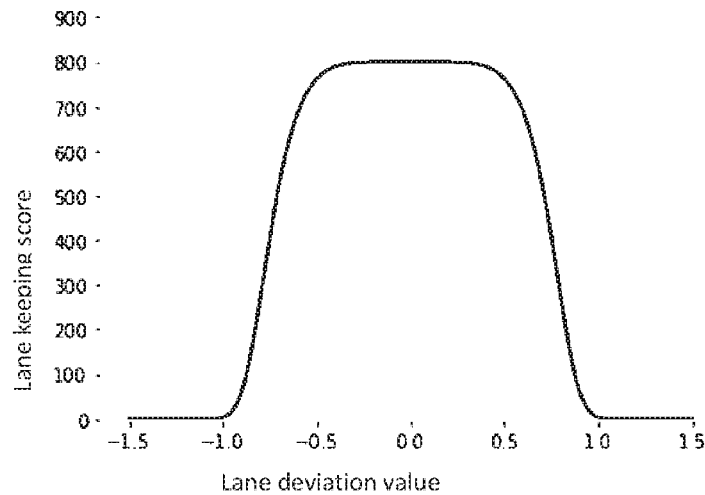
FIG. 15 is a schematic diagram of a relation between the lane keeping score and a lane deviation value in an embodiment of the present disclosure.

Refer to FIG. 15, which shows a relation between the lane keeping score and the lane deviation value in an embodiment of the present disclosure.

In step S143, a third penalty value is acquired according to the third cost value.

In one embodiment, the third cost value is converted into a third penalty value between 0 and 1. The third penalty value is:

$$\text{penalty}=2.0*(1/(1+e^{-cost/\alpha})-0.5)$$

wherein cost is the third cost value, and a is a real number, e.g., 360.

In step S144, the third driving behavior score is acquired according to the third penalty value and a third preset highest score.

In one embedment, the third driving behavior score is acquired according to score=MaxS*(1-penalty).

MaxS is the third preset highest score, e.g., 800 scores, and penalty is the third penalty value.

In this embodiment of the present disclosure, whether the driver drives in the corresponding lane can be learnt via the lane keeping score, so that the driver drives in the corresponding lane, and the driving safety of the driver is realized.

According to the driving behavior analysis method in the embodiments of the present disclosure, the driving behavior is analyzed according to the acquired image information of the running process to acquire a driving behavior score, so that the running process of the vehicle can be analyzed more accurately and comprehensively; the driving behavior score can be used for evaluating the driving situation of the driver and assisting the driver in improving the driving safety; and the driving situation of the driver is evaluated more comprehensively via the stop, following and lane keeping scores, so that the driving safety is improved.

Figure 16:
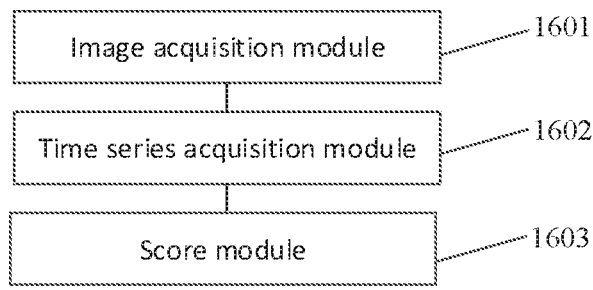
FIG. 16 is a schematic diagram of a driving behavior analysis device in an embodiment of the present disclosure.

Correspondingly, referring to FIG. 16, an embodiment of the present disclosure further provides a driving behavior analysis device, including:

an image acquisition module 1601, configured for acquiring image information in a running process of a target vehicle;

a time series acquisition module 1602, configured for acquiring time series data in the running process according to the image information; and a score module 1603, configured for acquiring a target driving behavior score for the running process according to the time series data.

In one embodiment, the time series data includes one or more of the following information corresponding to each timestamp: the lane where the target vehicle is located, the width of the lane where the target vehicle is located, the position of the target vehicle in the lane, a following distance between the target vehicle and a front vehicle in the same lane, the speed of the target vehicle and the distance between the target vehicle and a stop sign;

the target driving behavior score includes one or more of the following scores: a first driving behavior score acquired according to the speed of the target vehicle and the following distance between the target vehicle and the front vehicle in the same lane; a second driving behavior score acquired according to the speed of the target vehicle and the distance between the target vehicle and the stop sign; and a third driving behavior score acquired according to the width of the lane where the target vehicle is located and the position of the target vehicle in the lane in each timestamp;

the step of acquiring a target driving behavior score for the running process according to the time series data includes:

acquiring the target driving behavior score according to one or more of the first driving behavior score, the second driving behavior score and the third driving behavior score.

In one embodiment, the time series data includes the following information corresponding to each timestamp: the lane where the target vehicle is located, a following distance between the target vehicle and a front vehicle in the same lane and the speed of the target vehicle;

the time series acquisition module 1602 includes:

a lane acquisition sub-module, configured for performing lane detection according to the image information to acquire the lane where the target vehicle is located in each timestamp; and a following distance acquisition sub-module, configured for performing perception detection according to the image information to acquire the following distance between the target vehicle and a front vehicle in the same lane in each timestamp;

the device further includes:

a minimum following distance determination module, configured for determining a minimum following distance according to the speed of the target vehicle corresponding to each timestamp; and a first target driving behavior score acquisition module, configured for acquiring a target driving behavior score according to the minimum following distance and the following distance.

In one embodiment, the minimum following distance determination module is configured for determining the minimum following distance according to the speed, acceleration, speed correction parameter, preset reaction time and preset average parameter of the target vehicle.

In one embodiment, the first target driving behavior score acquisition module is configured for:

determining a first cost value according to the following distance and the minimum following distance;

acquiring a first penalty value according to the first cost value; and acquiring the target driving behavior score according to the first penalty value and a first preset highest score.

In one embodiment, the time series data includes the speed of the target vehicle and the distance between the target vehicle and a stop sign corresponding to each timestamp;

the time series acquisition module 1602 includes:

a distance acquisition sub-module, configured for acquiring the distance between the target vehicle and the stop sign according to the image information;

a stop region acquisition sub-module, configured for determining a stop region of the target vehicle according to the distance; and a lowest speed and time acquisition sub-module, configured for acquiring the lowest speed of the target vehicle within the stop region and a duration of the lowest speed.

The device further includes:

a second target driving behavior score acquisition module, configured for acquiring a target driving behavior score according to the lowest speed, the duration of the lowest speed and a first preset cost function.

In one embodiment, the second target driving behavior score acquisition module is configured for:

acquiring a second cost value according to the lowest speed, the duration of the lowest speed and the first preset cost function;

acquiring a second penalty value according to the second cost value; and acquiring the target driving behavior score according to the second penalty value and a second preset highest score.

In one embodiment, the time series data includes the width of the lane where the target vehicle is located and the position of the target vehicle in the lane in each timestamp;

the time series acquisition module 1602 is configured for performing lane detection according to the image information to acquire the width of the lane where the target vehicle is located and the position of the target vehicle in the lane in each timestamp;

the device further includes:

a third target driving behavior score acquisition module, configured for acquiring a target driving behavior score according to the width of the lane and the position of the vehicle in the lane.

In one embodiment, the third target driving behavior score acquisition module is configured for acquiring a lane deviation value according to the width of the lane and the position of the vehicle in the lane; acquiring a third cost value according to the second preset cost function and the lane deviation value; acquiring a third penalty value according to the third cost value; and acquiring the third driving behavior score according to the third penalty value and a third preset highest score.

Regarding the device in the above embodiment, the specific mode of operation executed by each module has been elaborated in the relevant embodiment of the method, and is thus not redundantly illustrated herein.

Correspondingly, the present disclosure further provides a computer readable storage medium storing computer programs, wherein the computer programs, when executed by a processor, cause the processor to perform the steps of the above-mentioned method for analyzing driving behavior.

Correspondingly, the present disclosure further provides electronic equipment, including: the above-mentioned computer readable storage medium; and one or more processors, configured for executing the program in the computer readable storage medium.

Figure 17:
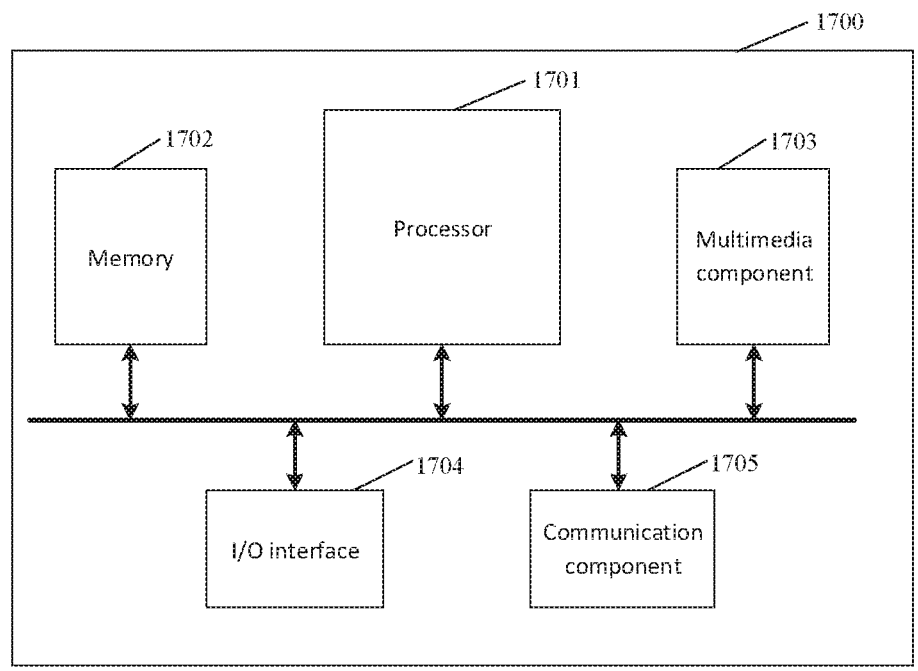
FIG. 17 is a block diagram of electronic equipment shown in an exemplary embodiment of the present disclosure.

FIG. 17 is a block diagram of electronic equipment 1700 shown in an exemplary embodiment. As shown in FIG. 17, the electronic equipment 1700 may include a processor 1701, a memory 1702, a multimedia component 1703, an input/output (I/O) interface 1704, a communication component 1705 and an image acquisition module described above. The processor 1701 is configured for controlling overall operation of the electronic equipment 1700 to complete all of or part of the steps of the above-mentioned method for analyzing driving behavior. The memory 1702 is configured for storing various types of data to support the operation in the electronic equipment 1700, and the data, for example, may include instructions for any application or method operated on the electronic equipment 1700 and data related to the application, e.g., contact data, received and transmitted messages, pictures, audios, videos, etc. The memory 1702 can be implemented by any type of volatile or non-volatile storage device or their combination, e.g., a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk. The multimedia component 1703 may include a screen and an audio component. The screen, for example, may be a touch screen, and the audio component is configured for outputting and/or inputting audio signals. For example, the audio component may include a microphone, which is configured for receiving external audio signals. The received audio signals can be further stored in the memory 1702 or transmitted via the communication component 1705. The audio component further includes at least one loudspeaker configured for outputting audio signals. The I/O interface 1704 provides an interface between the processor 1701 and other interface module, and the other interface module may be a keyboard, a mouse, buttons, etc. These buttons may be virtual buttons or physical buttons. The communication component 1705 is configured for wired or wireless communication between the electronic equipment 1700 and other equipment. The wireless communication, e.g., Wi-Fi, Bluetooth, near field communication (NFC), 2G, 3G, 4G or 5G, or one or a combination of them, and thus the corresponding communication component 1705 may include: a Wi-Fi module, a Bluetooth module, an NFC module, a 2G module, a 3G module, a 4G module or a 5G module.

In an exemplary embodiment, the electronic equipment 1700 may be implemented by one or more application specific integrated circuits (ASICs), digital signal processors (DSPs), digital signal processing devices (DSPDs), programmable logic devices (PLDs), Field Programmable Gate Arrays (FPGAs), controllers, microcontrollers, microprocessors or other electronic elements, and configured for executing the above-mentioned method for analyzing driving behavior.

The preferred embodiments of the present disclosure are elaborated above in combination with the accompanying drawings, but the present disclosure is not limited to the specific details in the above-mentioned embodiments. Multiple simple modifications may be made to the technical solutions of the present disclosure within the technical conception scope of the present disclosure, and these simple modifications fall into the protection scope of the present disclosure.

In addition, it should be noted that the specific technical features described in the above-mentioned specific embodiments may be combined in any appropriate mode without conflict. In order to avoid unnecessary repetition, various possible combinations are not stated in the present disclosure.

Moreover, various different embodiments of the present disclosure may also be combined randomly, and they also should be regarded as the content of the present disclosure as long as they do not go against the idea of the present disclosure.

The invention claimed is:

1. A method for analyzing driving behavior, comprising:
acquiring image information in a running process of a target vehicle through an image acquisition module of the target vehicle;
acquiring time series data in the running process according to the image information; and
acquiring a target driving behavior score for the running process according to the time series data;

wherein the time series data comprises a speed of the target vehicle and a distance between the target vehicle and a stop sign corresponding to each timestamp, a width of the lane where the target vehicle is located and a position of the target vehicle in the lane in each timestamp;

the step of acquiring the target driving behavior score for the running process according to the time series data comprises:

acquiring a second driving behavior score according to the speed of the target vehicle and the distance between the target vehicle and the stop sign, the second driving behavior score is used to indicate the stop situation when the driver encounters a stop sign;

acquiring a third driving behavior score according to the width of the lane and the position of the vehicle in the lane, the third driving behavior score is used to indicate whether the driver drives in the corresponding lane, the target driving behavior score includes the second driving behavior score and the third driving behavior score;

the step of acquiring a second driving behavior score according to the speed of the target vehicle and the distance between the target vehicle and the stop sign comprises:

determining a stop region of the target vehicle according to the distance between the target vehicle and the stop sign; and acquiring a lowest speed of the target vehicle within the stop region and a duration of the lowest speed according to the speed of the target vehicle;

acquiring a second cost value according to the lowest speed, the duration of the lowest speed and a first preset cost function;

acquiring a second penalty value according to the second cost value; and acquiring the second driving behavior score according to the second penalty value and a second preset highest score;

the step of acquiring a third driving behavior score according to the width of the lane and the position of the vehicle in the lane comprises:

acquiring a lane deviation value according to the width of the lane and the position of the vehicle in the lane;

acquiring a third cost value according to a second preset cost function and the lane deviation value;

acquiring a third penalty value according to the third cost value; and acquiring the third driving behavior score according to the third penalty value and the third preset highest score.

2. The method of claim 1, wherein the step of acquiring time series data in the running process according to the image information comprises:

performing lane detection according to the image information to acquire the lane where the target vehicle is located in each timestamp; and performing perception detection according to the image information to acquire a following distance between the target vehicle and a front vehicle in the same lane in each timestamp, the time series data also comprises the following distance between the target vehicle and a front vehicle in the same lane;

the step of acquiring a target driving behavior score for the running process according to the time series data also comprises:

acquiring a first driving behavior score according to the speed of the target vehicle and the following distance between the target vehicle and a front vehicle in the same lane, the first driving behavior score is used to indicate following distance control of the driver during vehicle following, the target driving behavior score also includes the first driving behavior score;

the step of acquiring a first driving behavior score according to the speed of the target vehicle and the following distance between the target vehicle and a front vehicle in the same lane comprises:

determining a minimum following distance according to the speed of the target vehicle corresponding to each timestamp; and acquiring the first driving behavior score according to the minimum following distance and the following distance between the target vehicle and a front vehicle in the same lane.

3. The method of claim 2, wherein the step of determining a minimum following distance according to the speed of the target vehicle corresponding to each timestamp comprises:

determining the minimum following distance $D_m$ by the following formula according to the speed, acceleration, speed correction parameter, preset reaction time and preset average parameter of the target vehicle;

$$D_m = c^2 * (S*t + f*S(S/a));$$

$$c = 1.1 * \tanh(S/\beta);$$

wherein t is a preset reaction time; S is the speed of the target vehicle; a is an acceleration; and $\beta$ is a speed correction parameter; f is a preset average parameter, f is used to correct the travel distance of the target vehicle, which is the distance that the target vehicle travels at a uniform acceleration for the preset reaction time t at the initial speed S and acceleration a, c is an intermediate variable used to calculate the minimum following distance $D_m$.

4. The method of claim 3, wherein the step of acquiring the first driving behavior score according to the minimum following distance and the following distance between the target vehicle and a front vehicle in the same lane comprises:

determining a first cost value according to the following distance and the minimum following distance;

acquiring a first penalty value according to the first cost value; and acquiring the first driving behavior score according to the first penalty value and a first preset highest score.

5. A non-transitory computer readable storage medium storing computer programs, wherein the computer programs, when executed by a processor, cause the processor to perform a method for analyzing driving behavior comprising:

acquiring image information in a running process of a target vehicle through an image acquisition module of the target vehicle-;

acquiring time series data in the running process according to the image information; and acquiring a target driving behavior score for the running process according to the time series data;

wherein the time series data comprises a speed of the target vehicle and a distance between the target vehicle and a stop sign corresponding to each timestamp, a width of the lane where the target vehicle is located and a position of the target vehicle in the lane in each timestamp;

the step of acquiring a target driving behavior score for the running process according to the time series data comprises:

acquiring a second driving behavior score according to the speed of the target vehicle and the distance between the target vehicle and the stop sign, the second driving behavior score is used to indicate the stop situation when the driver encounters a stop sign;

acquiring a third driving behavior score according to the width of the lane and the position of the vehicle in the lane, the third driving behavior score is used to indicate whether the driver drives in the corresponding lane, the target driving behavior score includes the second driving behavior score and the third driving behavior score;

the step of acquiring a second driving behavior score according to the speed of the target vehicle and the distance between the target vehicle and the stop sign comprises:

determining a stop region of the target vehicle according to the distance between the target vehicle and the stop sign; and acquiring a lowest speed of the target vehicle within the stop region and a duration of the lowest speed according to the speed of the target vehicle;

acquiring a second cost value according to the lowest speed, the duration of the lowest speed and first preset cost function;

acquiring a second penalty value according to the second cost value; and acquiring the second driving behavior score according to the second penalty value and a second preset highest score;

the step of acquiring a third driving behavior score according to the width of the lane and the position of the vehicle in the lane comprises:

acquiring a lane deviation value according to the width of the lane and the position of the vehicle in the lane;

acquiring a third cost value according to a second preset cost function and the lane deviation value;

acquiring a third penalty value according to the third cost value; and acquiring the third driving behavior score according to the third penalty value and a third preset highest score.

6. An electronic equipment, comprising:

the non-transitory computer readable storage medium of claim 5; and one or more processors, configured for executing the program in the non-transitory computer readable storage medium to implement a method for analyzing driving behavior comprising:

acquiring image information in a running process of a target vehicle through an image acquisition module of the target vehicle;

acquiring time series data in the running process according to the image information; and acquiring a target driving behavior score for the running process according to the time series data;

wherein the time series data comprises a speed of the target vehicle and a distance between the target vehicle and a stop sign corresponding to each timestamp, a width of the lane where the target vehicle is located and a position of the target vehicle in the lane in each timestamp;

the step of acquiring a target driving behavior score for the running process according to the time series data comprises:

acquiring a second driving behavior score according to the speed of the target vehicle and the distance between the target vehicle and the stop sign, the second driving behavior score is used to indicate the stop situation when the driver encounters a stop sign;

acquiring a third driving behavior score according to the width of the lane and the position of the vehicle in the lane, the third driving behavior score is used to indicate whether the driver drives in the corresponding lane, the target driving behavior score includes the second driving behavior score and the third driving behavior score;

the step of acquiring a second driving behavior score according to the speed of the target vehicle and the distance between the target vehicle and the stop sign comprises:

determining a stop region of the target vehicle according to the distance between the target vehicle and the stop sign; and acquiring a lowest speed of the target vehicle within the stop region and a duration of the lowest speed according to the speed of the target vehicle;

acquiring a second cost value according to the lowest speed, the duration of the lowest speed and first preset cost function;

acquiring a second penalty value according to the second cost value; and acquiring the second driving behavior score according to the second penalty value and a second preset highest score;

the step of acquiring a third driving behavior score according to the width of the lane and the position of the vehicle in the lane comprises:

acquiring a lane deviation value according to the width of the lane and the position of the vehicle in the lane;

acquiring a third cost value according to a second preset cost function and the lane deviation value;

acquiring a third penalty value according to the third cost value; and acquiring the third driving behavior score according to the third penalty value and a third preset highest score.

* * * * *